US009925865B2

United States Patent
Stack et al.

(10) Patent No.: US 9,925,865 B2
(45) Date of Patent: Mar. 27, 2018

(54) INSIDE MOUNTING MODULAR FUEL FILL POCKET ASSEMBLY FOR A VEHICLE

(71) Applicant: GM GLOBAL TECHNOLOGY OPERATIONS LLC, Detroit, MI (US)

(72) Inventors: Matthew M. Stack, Macomb Township, MI (US); James J. Uppleger, Saint Clair Shores, MI (US); Gordan N. Noll, St. Clair Shores, MI (US); Stanley P. Ciemerych, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 54 days.

(21) Appl. No.: 15/160,518

(22) Filed: May 20, 2016

(65) Prior Publication Data

US 2017/0334287 A1    Nov. 23, 2017

(51) Int. Cl.
*B60K 15/04* (2006.01)
*B60K 15/05* (2006.01)
*B62D 25/24* (2006.01)
*B60K 15/03* (2006.01)

(52) U.S. Cl.
CPC .............. *B60K 15/04* (2013.01); *B60K 15/05* (2013.01); *B62D 25/24* (2013.01); *B60K 2015/03486* (2013.01); *B60K 2015/0487* (2013.01); *B60K 2015/0553* (2013.01)

(58) Field of Classification Search
CPC ........ B60K 15/04; B60K 15/05; B62D 25/02; B62D 25/24

USPC ........................................................ 296/97.22
See application file for complete search history.

(56) References Cited

U.S. PATENT DOCUMENTS

| 8,556,327 B1 * | 10/2013 | Higgins ................. | B60K 15/05 |
| | | | 296/97.22 |
| 2015/0043959 A1 * | 2/2015 | Morris ..................... | F16B 17/00 |
| | | | 403/14 |

FOREIGN PATENT DOCUMENTS

JP          59045221 A  *  3/1984

OTHER PUBLICATIONS

English translation of JP 59045221; retreived Aug. 22, 2017 via the Japan Platform for Patent Information location at https://www.j-platpat.inpit.go.jp/web/all/top/BTmTopEnglishPage. (Year: 1984).*

* cited by examiner

*Primary Examiner* — Jason S Daniels
(74) *Attorney, Agent, or Firm* — Quinn IP Law

(57) ABSTRACT

A fuel fill pocket mounting system includes a mounting bracket having an inboard surface and an outboard surface. The outboard surface is bonded to an interior surface of a sheet molded composite body panel. A filler housing is attached to the inboard surface of the mounting bracket. The filler housing includes a wall defining an interior space. A snap in bezel is attached to the filler housing within the interior space. The bezel includes an outer lip disposed against the wall of the filler housing. The bezel includes a rubber material in sealing engagement with a fuel inlet pipe to limit fuel leakage between the bezel and the fuel inlet pipe.

19 Claims, 3 Drawing Sheets

INSIDE MOUNTING MODULAR FUEL FILL POCKET ASSEMBLY FOR A VEHICLE

TECHNICAL FIELD

The disclosure generally relates to a fuel fill pocket mounting system for a vehicle.

BACKGROUND

Many vehicles include a fuel filler pocket assembly that is positioned within an opening in a body panel of a vehicle. The fuel filler pocket assembly surrounds and supports an inlet end of a fuel tank inlet tube. The body panel is typically enclosed by a hinged door to cover the end of the inlet end of the fuel tank inlet tube, and conceal the fuel filler pocket assembly. The fuel filler pocket assembly is typically attached to the body panels by a "Z" flange, or fasteners that extend from an exterior side of the body panel, through the body panel and into engagement with the fuel filler pocket assembly. In either case, the Z flange or the fasteners are visible from the exterior of the body panel when the hinged door is open, and require that the opening in the body panel be large enough to accommodate the fastening of the fuel filler pocket assembly through the opening in the body panel.

SUMMARY

A vehicle is provided, and includes a body panel defining a fuel fill opening. The body panel has an exterior surface and an interior surface. A mounting bracket is attached to the body panel, and has an outboard surface and an inboard surface. The outboard surface of the mounting bracket is positioned against the interior surface of the body panel. A filler housing is attached to the mounting bracket, and is positioned against the inboard surface of the mounting bracket.

A fuel fill pocket assembly for a vehicle is also provided. The fuel fill pocket assembly includes a mounting bracket having an inboard surface and an outboard surface. The outboard surface is configured for bonded attachment to an interior surface of a sheet molded composite body panel. A filler housing is attached to the inboard surface of the mounting bracket. The filler housing includes a wall defining an interior space. A bezel is attached to the filler housing within the interior space. The bezel includes an outer lip disposed against the wall of the filler housing. The outer lip of the bezel includes a rubber material in sealing engagement with the wall to limit fuel leakage between the filler housing and the bezel.

Accordingly, the fuel fill pocket assembly includes the mounting bracket, which attaches the filler housing to the body panel from the interior surface or inboard side of the body panel. The mounting bracket is bonded to the interior surface of the body panel, and the filler housing is then attached to the inboard side of the mounting bracket. In so doing, attachment of the filler housing to the body panel does not require access from the exterior surface of the body panel or through the opening in the body panel, and conceals the means of attaching the filler housing to the body panel. Additionally, because the filler housing is not attached to the body panel through the opening in the body panel, the size of the opening in the body panel may be reduced relative to prior art systems that mount the filler housing from the exterior surface of the body panel or through the opening in the body panel.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
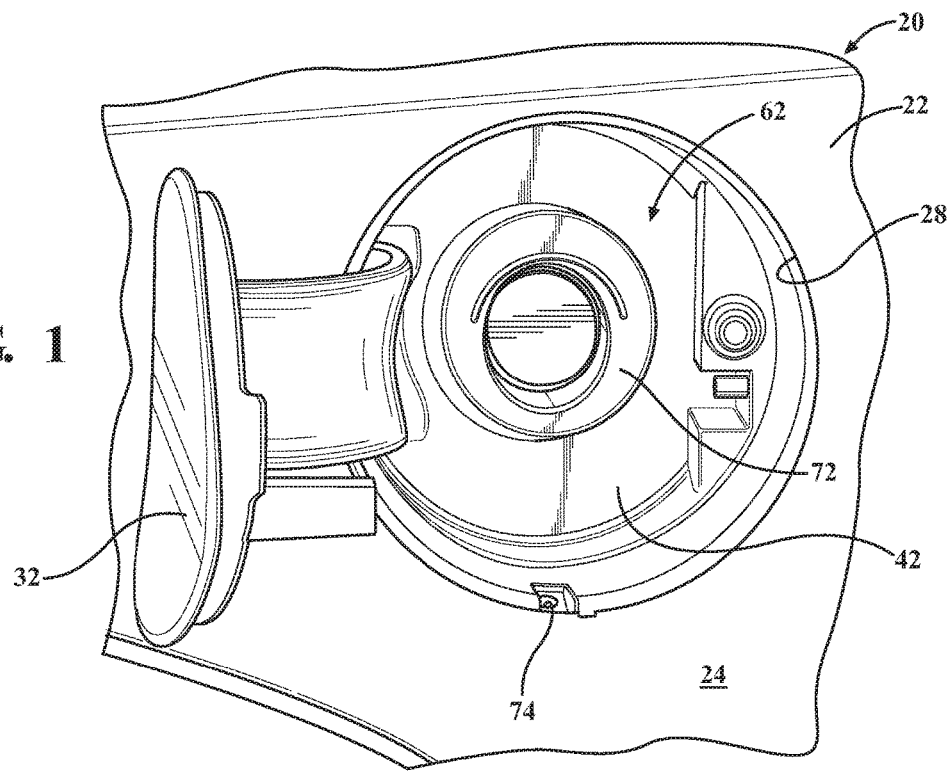
FIG. 1 is a schematic partial perspective view of an exterior side of a vehicle showing a body panel with a fuel fill pocket assembly attached thereto.
Figure 2:
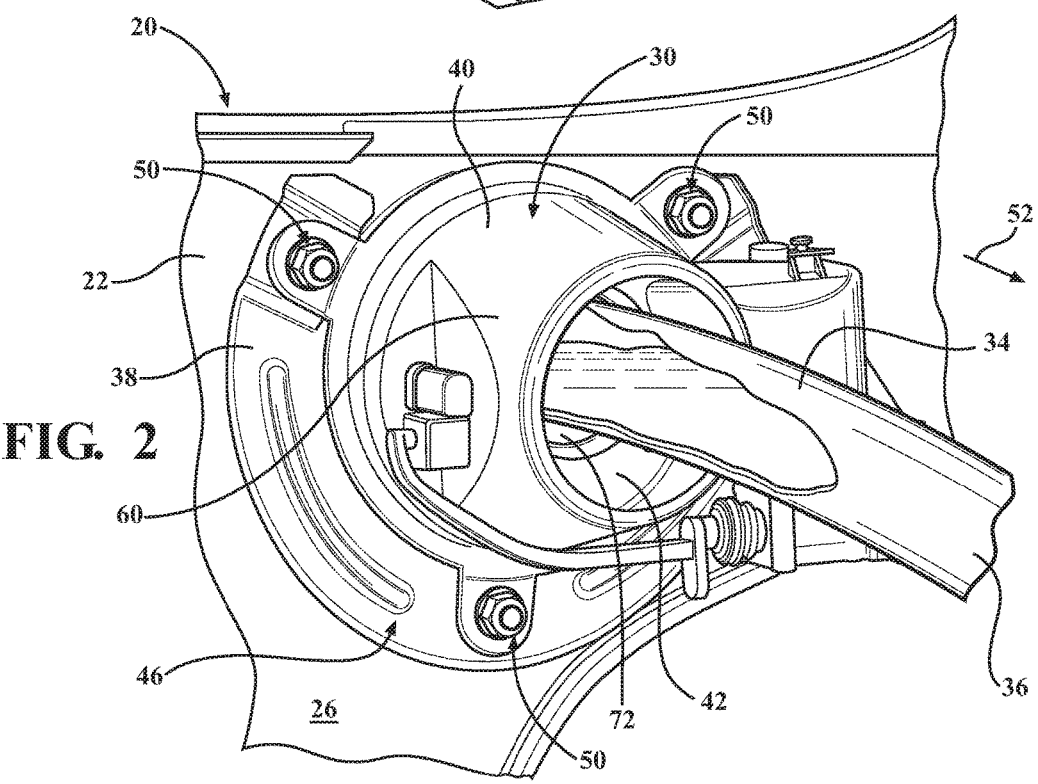
FIG. 2 is a schematic partial perspective view of an interior side of the vehicle showing the fuel fill pocket assembly attached to the body panel.

Referring to the Figures, wherein like numerals indicate like parts throughout the several views, a vehicle is generally shown at 20. Referring to FIGS. 1 and 2, the vehicle 20 may include any type and/or style of vehicle 20, such as but not limited to an automobile, a truck, a boat, a plane, a tractor, an ATV, etc. The vehicle 20 includes a body panel 22. The body panel 22 may be located at any location on the vehicle 20. As shown in FIG. 1, the body panel 22 includes an exterior surface 24 that partially defines an exterior shape of the vehicle 20. As shown in FIG. 2, the body panel 22 includes an interior surface 26 that opposes the exterior surface 24, which is generally hidden when viewed from the exterior of the vehicle 20.

As used herein, the terms "exterior" and "interior" are used to describe a position relative to a longitudinal center of the vehicle 20. An "exterior" feature is located farther from the longitudinal center of the vehicle 20 than an "interior" feature. Accordingly, for example, the exterior surface 24 of the body panel 22 is defined by the side of the body panel 22 located farthest from the longitudinal center of the vehicle 20, whereas the interior surface 26 of the body panel 22 is defined by the side of the body panel 22 that is located nearest to the longitudinal center of the vehicle 20.

Referring to FIG. 1, the body panel 22 defines a fuel fill opening 28. The fuel fill opening 28 is an opening in and through the body panel 22 that provides access to a fuel fill pocket assembly 30. The fuel fill pocket assembly 30 is described in greater detail below. A cover 32 or door may be attached to the body panel 22, and moveable between an open position providing access to the fuel fill pocket assembly 30, and a closed position concealing the fuel fill pocket assembly 30 and generally covering the fuel fill opening 28.

The cover 32 may be attached to the body panel 22 in any desirable manner that enables movement between the open position and the closed position. The cover 32 may be manually actuated by a user, or may be mechanically and/or electronically actuated as is known in the art.

The body panel 22 may include and be manufactured from any rigid material suitable for an exterior body panel 22 of a vehicle 20. For example, the body panel 22 may be manufactured from a metal, such as but not limited to steel or aluminum. Alternatively, the body panel 22 may include and be manufactured from a composite material, such as but not limited to a sheet molded composite material. As is known in the art, a sheet molded composite or compound is a material that includes strands of chopped fibers, such as but not limited to glass fibers or carbon fibers, mixed with a resin, such as but not limited to polyester resin, vinylester resin, or epoxy resin. Furthermore, it should be appreciated that the body panel 22 may be manufactured from some other material not specifically described herein.

As noted above, with reference to FIGS. 1 and 2, the fuel fill opening 28 in the body panel 22 provides access to the fuel fill pocket assembly 30. The fuel fill pocket assembly 30 is attached to the body panel 22, and is coupled to and supports an inlet end 34 of a fuel tank inlet tube 36. As is known, a fuel dispenser is inserted into the inlet end 34 of the inlet tube 36, through the fuel fill pocket assembly 30, to fill a fuel tank of the vehicle 20. Accordingly, the fuel fill pocket assembly 30 operates as a trim feature to close out the fuel fill opening 28 in the body panel 22, and also supports the inlet end 34 of the fuel inlet tube 36.

Figure 3:
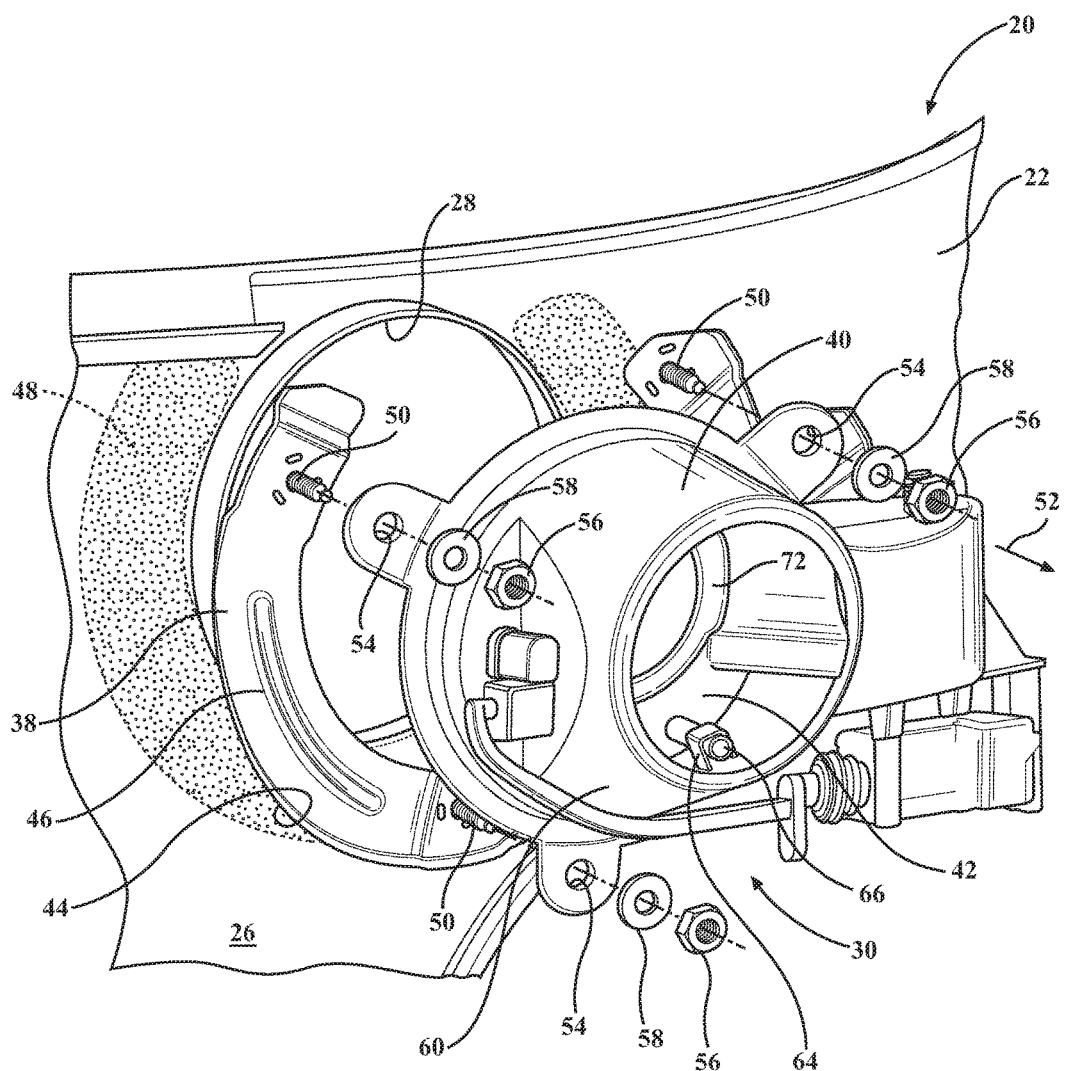
FIG. 3 is a schematic partial exploded perspective view of the interior side of the vehicle showing a filler housing and a mounting bracket.

Referring to FIGS. 2 and 3, the fuel fill pocket assembly 30 includes, but is not limited to, a mounting bracket 38, a filler housing 40, and a bezel 42. The mounting bracket 38 is attached to the body panel 22. The mounting bracket 38 includes an outboard surface 44 and an inboard surface 46. As used herein, the terms "outboard" and "inboard" are used to describe a position relative to the longitudinal center of the vehicle 20. An "outboard" feature is located farther from the longitudinal center of the vehicle 20 than an "inboard" feature. Accordingly, for example, the outboard surface 44 of the mounting bracket 38 is defined by the side of the mounting bracket 38 located farthest from the longitudinal center of the vehicle 20, whereas the inboard surface 46 of the mounting bracket 38 is defined by the side of the mounting bracket 38 that is located nearest to the longitudinal center of the vehicle 20.

The outboard surface 44 of the mounting bracket 38 is positioned against and attached to the interior surface 26 of the body panel 22. The mounting bracket 38 may include and be manufactured from any suitable material capable of supporting the filler housing 40 relative to the body panel 22. For example, the mounting bracket 38 may be manufactured from a metal, such as steel or aluminum. Alternatively, the mounting bracket 38 may be manufactured from a polymer or fiber reinforced polymer material. The mounting bracket 38 may be attached to the interior surface 26 of the body panel 22 in any suitable manner. The manner in which the mounting bracket 38 is attached to the body panel 22 is dependent upon the material used to manufacture both the body panel 22 and the mounting bracket 38. For example, the mounting bracket 38 may be attached to the body panel 22 with fasteners, by an adhesive 48 disposed between the interior surface 26 of the body panel 22 and the outboard surface 44 of the mounting bracket 38 that bonds the mounting bracket 38 to the body panel 22, by a weld, or some other suitable manner of attachment. In one exemplary embodiment, a metal mounting bracket 38 is bonded to the interior surface 26 of a sheet molded composite body panel 22 by a suitable adhesive 48.

Referring to FIGS. 2 and 3, the filler housing 40 is attached to the mounting bracket 38, and is positioned against the inboard surface 46 of the mounting bracket 38. In an exemplary embodiment, the mounting bracket 38 presents a plurality of fastening elements 50 adjacent the inboard surface 46 of the mounting bracket 38 for attaching the filler housing 40 to the mounting bracket 38. For example, the fastening elements 50 may include one or more threaded studs extending away from the inboard surface 46 of the mounting bracket 38, in an inboard direction 52 away from the body panel 22. As used herein, the inboard direction 52 should be interpreted as a direction toward the longitudinal center of the vehicle 20. The threaded studs may include, for example, T-studs attached to the mounting bracket 38. In one exemplary embodiment, the fastening elements 50 include T-studs attached to the outboard surface 44 of the mounting bracket 38, and including a threaded stud portion that extends through the mounting bracket 38 and past the inboard surface 46 of the mounting bracket 38, in the inboard direction 52. As shown in the Figures, the exemplary embodiment of the fuel fill pocket assembly 30 includes three fastening elements 50 attached to the mounting bracket 38. However, it should be appreciated that the fuel fill pocket assembly 30 may include more or less than the exemplary three fastening elements 50 shown.

The exemplary embodiment of the filler housing 40 includes a plurality of fastening apertures 54, with one of the threaded studs extending through a respective one of the fastening apertures 54. As shown in the Figures, the exemplary embodiment of the fuel fill pocket assembly 30 includes three fastening elements 50, i.e., threaded studs, and three fastening apertures 54. It should be appreciated that the number of fastening apertures 54 will be dependent upon the number of fastening elements 50. A nut 56 is disposed in threaded engagement with each fastening element, i.e., each threaded stud, and secures the filler housing 40 relative to the mounting bracket 38. A washer 58 may be disposed between each respective nut 56 and the filler housing 40. While the exemplary embodiment shown in the Figures and described herein includes the filler housing 40 being attached to the mounting bracket 38 via the threaded studs and their respective nuts 56, it should be appreciated that the filler housing 40 may be attached to the mounting bracket 38 in some other manner, not shown or described herein.

Figure 4:
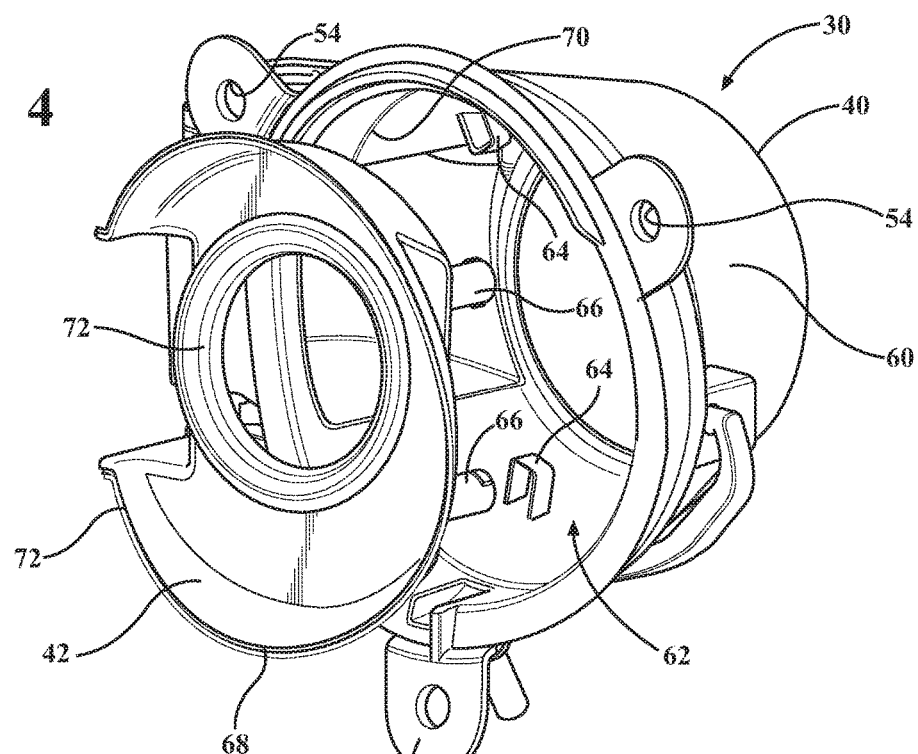
FIG. 4 is a schematic exploded perspective view of the fuel fill pocket assembly from a first angle.
Figure 5:
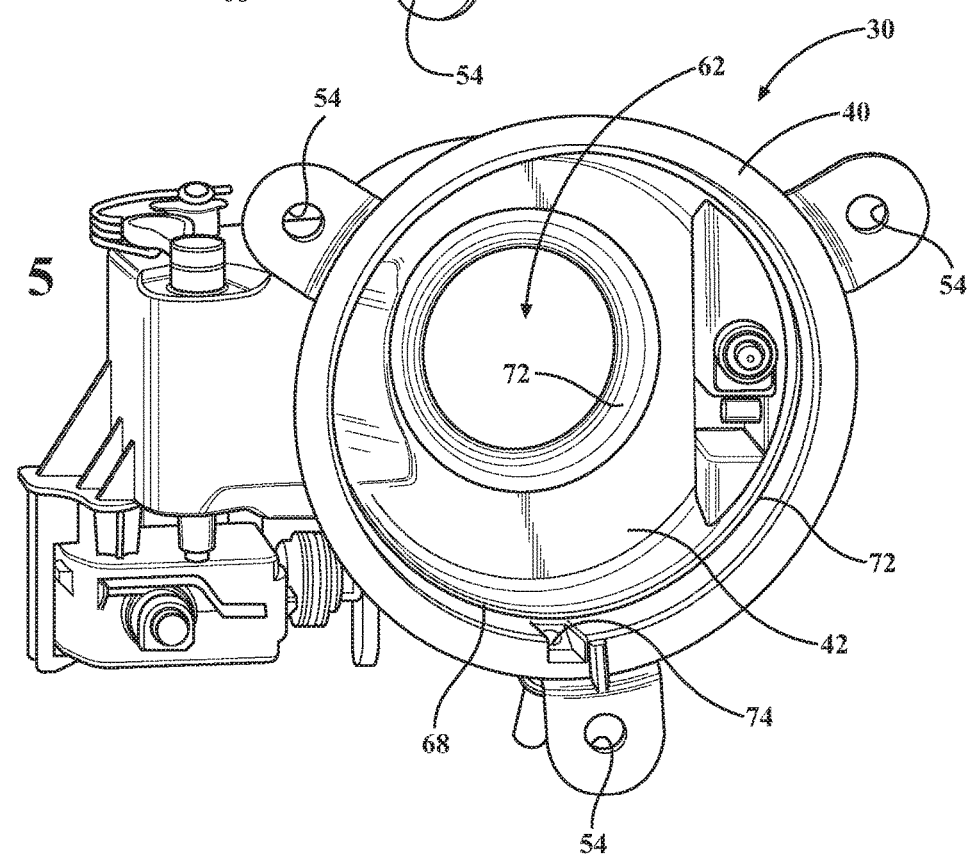
FIG. 5 is a schematic exploded perspective view of the fuel fill pocket assembly from a second angle.

Referring to FIGS. 4 and 5, the filler housing 40 includes a wall 60 defining an interior space 62. The wall 60 may generally be defined as cylindrical or a truncated cone. The bezel 42 is attached to the filler housing 40 within the interior space 62. The bezel 42 may include and be manufactured from any suitable material that will not deteriorate when exposed to the particular fuel type used by the vehicle 20. For example, in an exemplary embodiment, the bezel 42 may include and be manufactured from a polymer material or fiber reinforced polymer material. However, it should be appreciated that the bezel 42 may be manufactured from some other material not specifically described herein.

The bezel 42 may be attached to the filler housing 40 in any suitable manner. For example, the exemplary embodiment shown in the Figures includes the filler housing 40 having a plurality of female connection portions 64 formed thereon, and the bezel 42 includes a corresponding number of male connection portions 66 extending therefrom. The male connection portions 66 are received within a respective one of the female connection portions 64 to form an interlocking snap fit connection therebetween. It should be appreciated that the bezel 42 may be attached to the filler housing 40 using some other configuration of a snap fit connection, or by some other connection type. For example, the bezel 42 may be attached to the filler housing 40 using one or more fasteners.

The bezel 42 includes an outer lip 68. The outer lip 68 is positioned at an outboard end of the bezel 42, and positioned against the wall 60 of the filler housing 40. The outer lip 68 provides a generally radial seal around the intersection of the wall 60 and the bezel 42. The filler housing 40 may include a seat 70, shown in FIG. 4, with the outer lip 68 of the bezel 42 disposed against or seated on the seat 70.

Preferably, the bezel 42 includes a sealing material 72 disposed in sealing engagement with the inlet tube 36. The sealing material 72 may include any material capable of forming a seal between the bezel 42 and the inlet tube 36, to prevent fuel from seeping therebetween. For example, the sealing material 72 may include, but is not limited to, a rubber material that is over molded onto the bezel 42, and disposed around an outer periphery of the inlet tube 36.

Referring to FIG. 5, the filler housing 40 may include a drain port 74. The drain port 74 is disposed in fluid communication with the fuel tank, and directs runoff fuel from the fuel fill pocket assembly 30 back to the fuel tank. The drain port 74 is preferably located at the lowermost point of the filler housing 40, adjacent the interior surface 26 of the body panel 22, so that fuel runoff naturally drains toward the drain port 74. The bezel 42 includes a shape that is suitable for directing fuel runoff into the drain port 74. For example, the exemplary embodiment of the bezel 42 that is shown in the Figures includes a generally truncated conical shape that directs fuel runoff toward the interior surface 26 of the body panel 22 and toward the drain port 74. It should be appreciated that the drain port 74 may be positioned at some other location in the filler housing 40, and that the shape of the bezel 42 may vary from the exemplary embodiment in order to direct fuel runoff to the specific location of the drain port 74.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A vehicle comprising:
a body panel defining a fuel fill opening, and having an exterior surface and an interior surface;
a mounting bracket attached to the body panel, and having an outboard surface and an inboard surface, with the outboard surface of the mounting bracket positioned against the interior surface of the body panel;
a filler housing attached to the mounting bracket, and positioned against the inboard surface of the mounting bracket; and
wherein the filler housing includes an interior space, and a bezel attached to the filler housing within the interior space.

2. The vehicle set forth in claim 1, wherein the body panel is a sheet molded composite panel.

3. The vehicle set forth in claim 1, wherein the outboard surface of the mounting bracket is bonded to the interior surface of the body panel.

4. The vehicle set forth in claim 3, further comprising an adhesive disposed between the interior surface of the body panel and the outboard surface of the mounting bracket, wherein the adhesive bonds the mounting bracket to the body panel.

5. The vehicle set forth in claim 4, wherein the mounting bracket is a metal.

6. The vehicle set forth in claim 1, wherein the mounting bracket presents a fastening element adjacent the inboard surface of the mounting bracket for attaching the filler housing to the mounting bracket.

7. The vehicle set forth in claim 6, wherein the fastening element includes a threaded stud extending away from the inboard surface of the mounting bracket, in an inboard direction away from the body panel.

8. The vehicle set forth in claim 7, wherein the filler housing includes a fastening aperture, with the threaded stud extending through the fastening aperture.

9. The vehicle set forth in claim 8, further comprising a nut disposed in threaded engagement with the threaded stud and securing the filler housing relative to the mounting bracket.

10. The vehicle set forth in claim 1, wherein the filler housing includes a seat.

11. The vehicle set forth in claim 10, wherein the bezel includes an outer lip disposed against the seat.

12. The vehicle set forth in claim 1, wherein the bezel includes a sealing material configured for sealing engagement with a fuel inlet tube.

13. The vehicle set forth in claim 12, wherein the sealing material is a rubber material over molded onto the bezel.

14. The vehicle set forth in claim 13, wherein the bezel is a polymer material.

15. The vehicle set forth in claim 1, wherein the filler housing includes a drain port.

16. The vehicle set forth in claim 15, wherein the bezel includes a shape for directing fuel runoff into the drain port.

17. The vehicle set forth in claim 1, wherein the filler housing includes a female connection portion, and the bezel includes a male connection portion, with the male connection portion received within the female connection portion to form an interlocking snap fit connection therebetween.

18. A fuel fill pocket assembly for a vehicle, the fuel fill pocket assembly comprising:
a mounting bracket having an inboard surface and an outboard surface, wherein the outboard surface is configured for bonded attachment to an interior surface of a sheet molded composite panel;
a filler housing attached to the inboard surface of the mounting bracket, and including a wall defining an interior space;
a bezel attached to the filler housing within the interior space, and including an outer lip disposed against the wall of the filler housing; and
wherein the bezel includes a rubber material for sealing engagement with a fuel inlet pipe to limit fuel leakage between the bezel and the fuel inlet pipe.

19. The fuel fill pocket assembly set forth in claim 18, wherein the filler housing includes a female connection portion, and the bezel includes a male connection portion, with the male connection portion received within the female connection portion to form an interlocking snap fit connection therebetween.

* * * * *